(12) United States Patent
Ihle et al.

(10) Patent No.: US 10,132,689 B2
(45) Date of Patent: Nov. 20, 2018

(54) TEMPERATURE SENSOR SYSTEM AND METHOD FOR PRODUCING A TEMPERATURE SENSOR SYSTEM

(71) Applicant: EPCOS AG, Munich (DE)

(72) Inventors: Jan Ihle, Grambach (AT); Oliver Bard, Falkensee (DE); Steffen Mehlig, Berlin (DE); Wolfgang Grundmann, Birkenwerder (DE)

(73) Assignee: EPCOS AG, Munich (DE)

( * ) Notice: Subject to any disclaimer, the term of this patent is extended or adjusted under 35 U.S.C. 154(b) by 541 days.

(21) Appl. No.: 14/442,333

(22) PCT Filed: Sep. 27, 2013

(86) PCT No.: PCT/EP2013/070256
§ 371 (c)(1),
(2) Date: May 12, 2015

(87) PCT Pub. No.: WO2014/072126
PCT Pub. Date: May 15, 2014

(65) Prior Publication Data
US 2016/0258818 A1    Sep. 8, 2016

(30) Foreign Application Priority Data

Nov. 12, 2012 (DE) .................. 10 2012 110 858

(51) Int. Cl.
*G01K 1/08* (2006.01)
*G01K 7/22* (2006.01)

(52) U.S. Cl.
CPC ................ *G01K 1/08* (2013.01); *G01K 7/22* (2013.01)

(58) Field of Classification Search
CPC . G01K 1/08; G01K 7/22; G01K 7/223; B28B 1/24; C04B 35/10; C04B 35/64
See application file for complete search history.

(56) References Cited

U.S. PATENT DOCUMENTS

| | | |
|---|---|---|
| 4,796,671 A | 1/1989 | Furushima et al. |
| 5,009,718 A | 4/1991 | Schmidt |
| 5,209,571 A * | 5/1993 | Kendall ................ C21C 5/4673 |
| | | 136/233 |

(Continued)

FOREIGN PATENT DOCUMENTS

| | | |
|---|---|---|
| CN | 1043041 A | 6/1990 |
| CN | 2658730 Y | 11/2004 |

(Continued)

*Primary Examiner* — Lisa Caputo
*Assistant Examiner* — Philip Cotey
(74) *Attorney, Agent, or Firm* — Slater Matsil, LLP (57) ABSTRACT

The invention relates to a temperature sensor system comprising a temperature probe element and a first ceramic housing part. The temperature probe element comprises a sensor element and electrical feed lines. The first ceramic housing part comprises a sleeve-shaped lower part with a closed lower end and an open upper end, and an upper part connected to the open upper end. The sensor element is arranged in the sleeve-shaped lower part. The upper part has recesses in which the electrical feed lines are partially arranged and guided. The lower part and the upper part form one piece. Also disclosed is a method for producing a temperature sensor system.

21 Claims, 4 Drawing Sheets

(56) References Cited

U.S. PATENT DOCUMENTS

| | | | |
|---|---|---|---|
| 5,697,706 A * | 12/1997 | Ciaravino | G01K 3/14 374/166 |
| 2002/0075129 A1* | 6/2002 | Mizoguchi | G01K 1/16 338/25 |
| 2002/0090019 A1* | 7/2002 | Marto | G01K 1/08 374/185 |
| 2006/0222050 A1* | 10/2006 | Byrne | G01K 1/12 374/208 |
| 2007/0110124 A1 | 5/2007 | Shiraki et al. | |
| 2007/0171959 A1* | 7/2007 | Irrgang | G01K 1/10 374/185 |
| 2007/0195857 A1* | 8/2007 | Krishnamurthy | G01K 1/16 374/148 |
| 2009/0148657 A1* | 6/2009 | Ihle | B28B 1/24 428/131 |
| 2010/0126002 A1* | 5/2010 | Nyffenegger | G01K 1/08 29/613 |
| 2010/0327849 A1* | 12/2010 | Kamen | A61M 1/1605 324/105 |
| 2011/0013669 A1* | 1/2011 | Raj | G01K 1/08 374/179 |
| 2012/0043131 A1 | 2/2012 | Christov et al. | |
| 2013/0223479 A1* | 8/2013 | Satou | G01K 1/12 374/163 |

FOREIGN PATENT DOCUMENTS

| | | |
|---|---|---|
| CN | 201075039 Y | 6/2008 |
| DE | 3708844 C2 | 7/1990 |
| DE | 10238628 A1 | 3/2004 |
| DE | 10340636 B3 | 1/2005 |
| DE | 102004018354 A1 | 11/2005 |
| DE | 102004035628 A1 | 2/2006 |
| DE | 102007032694 A1 | 1/2009 |
| DE | 102009008457 A1 | 8/2010 |
| EP | 2420807 A2 | 2/2012 |
| JP | H1123379 A | 1/1999 |
| JP | 2005024344 A | 1/2005 |
| JP | 2010-32237 A | 2/2010 |
| JP | 2012517367 A | 8/2012 |

* cited by examiner

TEMPERATURE SENSOR SYSTEM AND METHOD FOR PRODUCING A TEMPERATURE SENSOR SYSTEM

This patent application is a national phase filing under section 371 of PCT/EP2013/070256, filed Sep. 27, 2013, which claims the priority of German patent application 102012110858.7, filed Nov. 12, 2012, each of which is incorporated herein by reference in its entirety.

TECHNICAL FIELD

The present invention relates to a temperature sensor system and a method for producing the same.

BACKGROUND

For monitoring and control in a wide range of applications, temperatures are measured, for example using ceramic NTC thermistors (negative temperature coefficient thermistors), silicon temperature sensors (for example what are known as "KTY temperature sensors"), platinum temperature sensors ("PRTDs" or "platinum resistance temperature detectors") or thermocouples ("TCs").

For easy mounting in an application, for sufficient mechanical stability, and for protection of the actual temperature sensor element against external influences, as well as for avoidance of corrosion by aggressive media, the installation is provided in housings that usually consist of plastics, of simple metal structures or of plastic/metal composites. For electrical connection, plug contacts and/or line feeds are usually integrated into the housings. Suitable sealing of such systems is provided with use of seals, potting materials and/or adhesives.

Sensor systems with plastic or polymer housings, however, cannot be used for the measurement of very high temperatures. The maximum working temperatures of such systems with plastic or polymer housings are limited to approximately 200° C. to 250° C. Metals, by contrast, which are essentially more thermally stable, have the disadvantage that complex housing shapes are difficult to produce and therefore the geometric requirements for the application usually cannot be met. Furthermore, sensor systems with metal housings can be used only to a limited extent in particularly aggressive media due to the appearance of corrosion. A further considerable disadvantage of the systems constructed in this way is the delayed response time thereof due to additional design-induced heat transfers and low thermal conductivity of the used materials.

A sensor system having a metal housing is known from document EP 2 420 807 A2.

Document JP 2010 032 237 A describes a sensor system having a ceramic sleeve.

SUMMARY

Embodiments of the present invention include temperature sensor systems that are highly robust and also have a short response time. Temperature sensor systems and methods for producing temperature sensor systems according to exemplary embodiments of the invention are described herein.

A temperature sensor system according to at least one embodiment comprises a temperature probe element comprising a sensor element and electrical feed lines. The sensor element may be, for example, a thermistor element, a silicon or platinum sensor element, or a thermocouple.

The temperature sensor system also comprises a first ceramic housing part. The first ceramic housing part comprises a sleeve-shaped lower part with a closed lower end and an open upper end as well as an upper part connected to the open upper end. The closed lower end of the sleeve-shaped lower part can be formed on the outer side of the first ceramic housing part, for example as a conically tapering tip or rounded tip of the sleeve-shaped lower part. The sensor element of the temperature probe element is preferably arranged in the sleeve-shaped lower part. By way of example, the sensor element can be arranged within the sleeve-shaped lower part in the vicinity of the closed lower end, wherein the electrical feed lines run from the sensor element in the direction of the open upper end.

In accordance with further embodiments the upper part of the first ceramic housing part connected to the open upper end has recesses, in which the electrical feed lines of the temperature probe element are arranged and guided at least in part. The recesses can be embodied for example in the form of inwardly arranged pockets or indentations, which guide and receive the electrical feed lines.

In accordance with a further embodiment the lower part and the upper part of the first ceramic housing part are formed in one piece. By way of example, the lower part and the upper part can be produced in a common manufacturing process. In particular, the lower part and the upper part are not two separately produced components that are interconnected by means of a connection method, for example with the aid of a fastening means. There are advantageously no interfaces provided between the lower part and the upper part of the first ceramic housing part.

In accordance with a further embodiment the first ceramic housing part is an injection-molded part. By way of example, the first ceramic housing part can be produced by means of what is known as ceramic injection molding technology. Very complex ceramic housing designs adapted to customer-specific requirements that have high mechanical strength can be produced advantageously with the aid of ceramic injection molding technology in a precise and reproducible manner.

In accordance with a further embodiment the first ceramic housing part comprises a ceramic material with high thermal conductivity. By way of example, the first ceramic housing part may comprise aluminum oxide, aluminum nitride or silicon carbide, or may consist of aluminum oxide, aluminum nitride or silicon carbide.

These materials advantageously have a very high mechanical strength and provide the temperature sensor system with the necessary mechanical stability in order to satisfy the stipulated loads in the application. Furthermore, the temperature sensor system has very short response times due to the material properties of the first ceramic housing part. The response times lie for example below 6 seconds, and advantageously below 3 seconds, depending on the wall thickness and material of the first ceramic housing part.

In accordance with further embodiments the first ceramic housing part has, in the region of the sleeve-shaped lower part, wall thicknesses between 0.3 mm and 3 mm. In accordance with an exemplary embodiment the first ceramic housing part has, in the region of the sleeve-shaped lower part, wall thicknesses between 0.5 mm and 1.5 mm. A particularly short response time of the temperature sensor system can thus be attained with simultaneously sufficient stability.

In accordance with a further embodiment the temperature sensor system comprises a second ceramic housing part which is connected to the upper part of the first ceramic housing part. The second ceramic housing part preferably closes the temperature sensor system. The upper part may comprise an extension, for example, which protrudes into the open upper end of the sleeve-shaped lower part and by means of which the upper part can be fixed to the lower part. The extension preferably comprises recesses in which the electrical feed lines of the temperature probe element are arranged and guided at least in part. The first and the second ceramic housing part can thus be provided with integrated line guides preferably matched geometrically to the electrical feed lines. Furthermore, at the first and second ceramic housing part sealing faces can be provided, which for example can be filled with a connecting substance for bonding.

In accordance with a further embodiment the second ceramic housing part comprises the same material as the first ceramic housing part. The second ceramic housing part, similarly to the first ceramic housing, is preferably an injection-molded part that can be produced by means of ceramic injection molding technology.

In accordance with a further embodiment the first and the second ceramic housing part are interconnected by a connecting substance. The connecting substance may comprise a polymer, glass or a ceramic adhesive or may be a polymer, glass or ceramic adhesive, for example depending on the working temperature of the temperature sensor system. The first and the second ceramic housing part are preferably interconnected in a force-fitting and form-fitting manner by means of the connecting substance via sealing faces.

In accordance with a further embodiment the temperature sensor system comprises a potting material, which is arranged in the lower part of the first ceramic housing part and encases the sensor element. The sensor element is preferably encased entirely by the potting material. The potting material for example may comprise a polymer, preferably a thermally stable polymer, a glass or a cement-like material, such as aluminum oxide cement, or may consist of one of these materials. Here, the selection of the potting material is dependent in particular on the working temperature of the temperature sensor system. By way of example, the potting material with a working temperature up to 300° C. may comprise a thermally stable polymer or may consist thereof. With working temperatures up to 1000° C., glass or a cement-like material is preferred in particular.

In accordance with a further embodiment the potting material and the connecting substance comprise the same material. By way of example, a thermally stable potting material with adhesive properties can be used as potting material. The material for the bonding of the first and second ceramic housing part can also be used simultaneously to fix the electrical feed lines and/or connection lines connected to the electrical feed lines and/or to fill a point of connection to the electrical feed lines and line guides.

In accordance with a further embodiment the electrical feed lines of the temperature probe element comprise one or more thermally stable materials, preferably with low corrosion tendency, or consist of one or more such materials. The electrical feed lines can be, for example, wires made of iron or made of a noble material, such as platinum, gold or silver. Furthermore, the electrical feed lines can be wires made of a steel alloy that is stable at high temperatures, for example with a high content of chromium and/or nickel, or can be formed as copper wires sheathed with nickel.

In accordance with a further embodiment the electrical feed lines are connected to connection lines. The connection lines are preferably thermally stable. By way of example, the connection lines can also be guided at least in part in the recesses of the upper part of the first ceramic housing part. The electrical feed lines are connected to the connection lines for example via high-temperature soldering processes, such as hard soldering, crimping or welding.

In accordance with a further embodiment the connection lines are sheathed at least in sub-regions. By way of example, the connection lines have a sheathing that for example up to working temperatures of 300° C. comprises a polymer or consists of a polymer. At working temperatures above 300° C., for example between 300° C. and 1000° C., the sheathing may comprise glass fibers or consist thereof. In accordance with a further embodiment the connection lines are embodied as metal-sheathed mineral-insulated lines. The connection lines can be connected to an electrical interface for example via a plug-in connection or via crimping, soldering or welding, depending on requirements.

In accordance with a further embodiment the temperature sensor system comprises an exit region, in which the electrical feed lines and/or the connection lines exit from the first and/or second ceramic housing part. The exit region is preferably closed by means of a seal. The seal may comprise, for example, a polymer, a glass or a ceramic potting material, or may consist of one of these materials. Here, a seal with a polymer is particularly suitable with working temperatures up to 300° C., and a seal by means of glass is particularly suitable with working temperatures above 300° C. In accordance with an exemplary embodiment the seal comprises the same material as the potting material and/or as the connecting substance.

In accordance with a further embodiment the sensor element is an NTC sensor element. NTC sensor elements are characterized in particular by their low production costs. The NTC sensor element can be provided for example with a glass encapsulation.

In accordance with a further embodiment the sensor element has a perovskite structure. By way of example, the sensor element may have a perovskite structure comprising the elements Y, Ca, Cr, Al, O. The sensor element preferably comprises ceramic materials with a perovskite structure of general chemical formula $ABO_3$. Sensor elements of this type are preferred in particular for use at high application temperatures, for example between 300° C. and 1000° C. The functional ceramic sensor element particularly preferably has the composition $(Y_{1-x}Ca_x)(Cr_{1-y}Al_y)O_3$ with x=0.03 to 0.05 and y=0.85.

In accordance with a further embodiment the sensor element has a spinel structure. By way of example, the sensor element may have a spinel structure comprising the elements Ni, Co, Mn, O. The sensor element preferably comprises ceramic materials with a spinel structure of general chemical formula $AB_2O_4$ or $B(A,B)O_4$. Sensor elements of this type are preferred in particular for use at low application temperatures, for example up to 300° C. The functional ceramic sensor element particularly preferably has the composition $Co_{3-(x+y)}Ni_xMn_yO_4$ with x=1.32 and y=1.32.

Advantages of the temperature sensor system described here include the very precise embodiment of the housing dimensions, which enables simple and standardized mounting without additional system elements, simultaneously very short response times, a very high mechanical and chemical robustness, and also extreme long-term stability. A temperature sensor system described here encapsulated ceramically by the first and second ceramic housing part can be used also at high application temperatures and in particularly aggressive media or gases.

Furthermore, a method for producing a temperature sensor system is specified. The temperature sensor systems producible or produced thereby may have one or more features of the aforementioned embodiments. The embodiments described previously and hereinafter apply equally for the temperature sensor system and the method for producing the temperature sensor systems.

In accordance with an embodiment the temperature probe element and also the first and the second ceramic housing part, which for example all produced by means of ceramic injection molding technology, are provided. When producing the first and second ceramic housing part, a ceramic feedstock for example, which comprises a structural ceramic powder, such as aluminum oxide powder, aluminum nitride powder or silicon carbide powder, and an organic binder, is injected into an appropriate mold. The 'green bodies' produced therefrom are then preferably largely freed from the organic component in a debindering process, which is performed in two steps, i.e. aqueously and thermally, or in one step, i.e. only thermally. The debindered bodies are then sintered preferably at a suitable temperature, for example in the case of aluminum oxide at approximately 1600° C. to 1700° C., depending on purity.

In accordance with an embodiment the temperature probe element is arranged in the sleeve-shaped lower part of the first ceramic housing part. Potting material is then introduced into the first ceramic housing part in such a manner that the sensor element is completely encased by the potting material. Furthermore, part of the electrical feed line is arranged in the recesses of the upper part of the first ceramic housing part. The upper part of the first ceramic housing part is then connected to the second ceramic housing part by means of a connecting substance, which for example comprises a polymer, a glass or a ceramic adhesive. In accordance with a preferred embodiment the potting material and the connecting substance comprise the same material.

In accordance with a further embodiment the electrical feed lines of the temperature probe element are connected to the connection lines by means of hard soldering, crimping or welding. Furthermore, sub-regions of the electrical feed lines and/or the connection lines are preferably arranged partly in the recesses of the upper part of the first ceramic housing part prior to the connection of the upper part to the second ceramic housing part.

In accordance with a further embodiment the connection lines are then sealed by means of a polymer or by means of glass in an exit region from the first and/or second ceramic housing part.

Further advantages and advantageous embodiments of the temperature sensor system will emerge from the embodiments described hereinafter in conjunction with FIGS. 1 to 7.

DETAILED DESCRIPTION OF ILLUSTRATIVE EMBODIMENTS

Identical or identically acting components may be provided with the same reference signs in the exemplary embodiments and figures. In principle, the illustrated elements and dimensions thereof relative to one another are not to be considered as to scale. Rather, individual elements, such as layers, components and regions, can be illustrated in bold or in an enlarged manner for improved presentability and/or for improved understanding.

Figure 1:
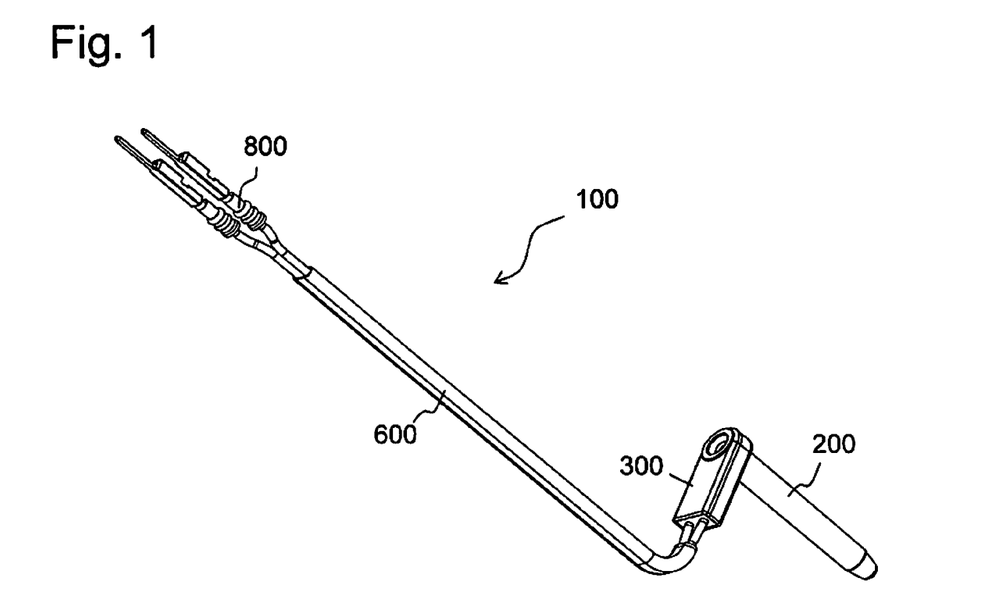
FIGS. 1-4 show schematic illustrations of a temperature sensor system in accordance with an exemplary embodiment.
Figure 2:
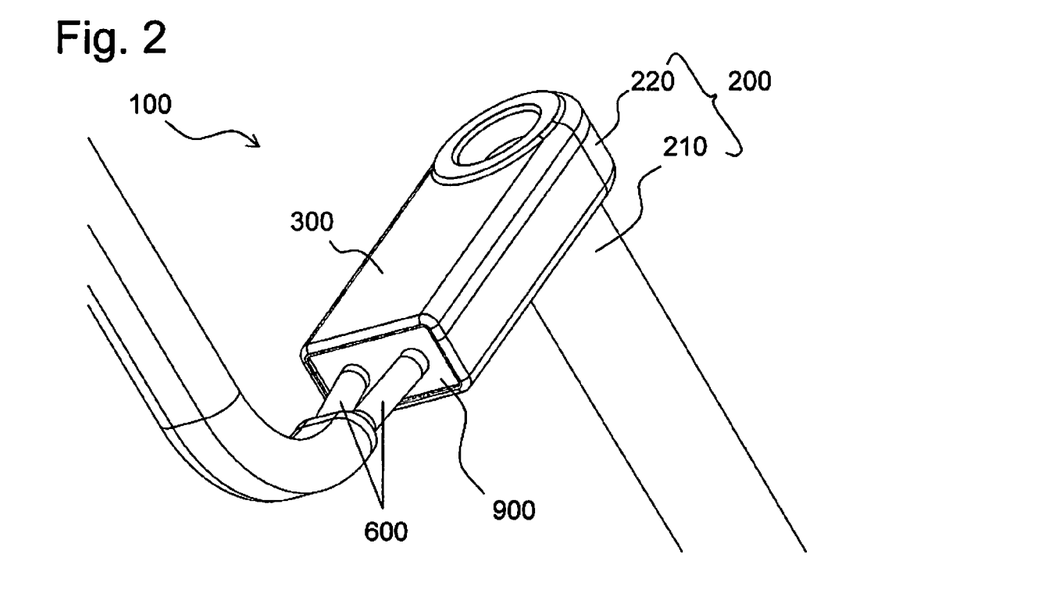
Figure 3:
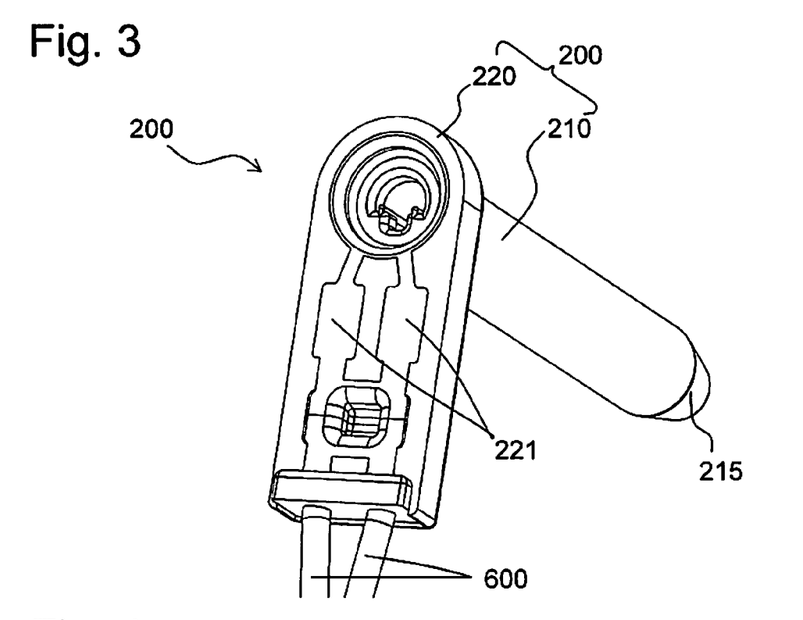
Figure 4:
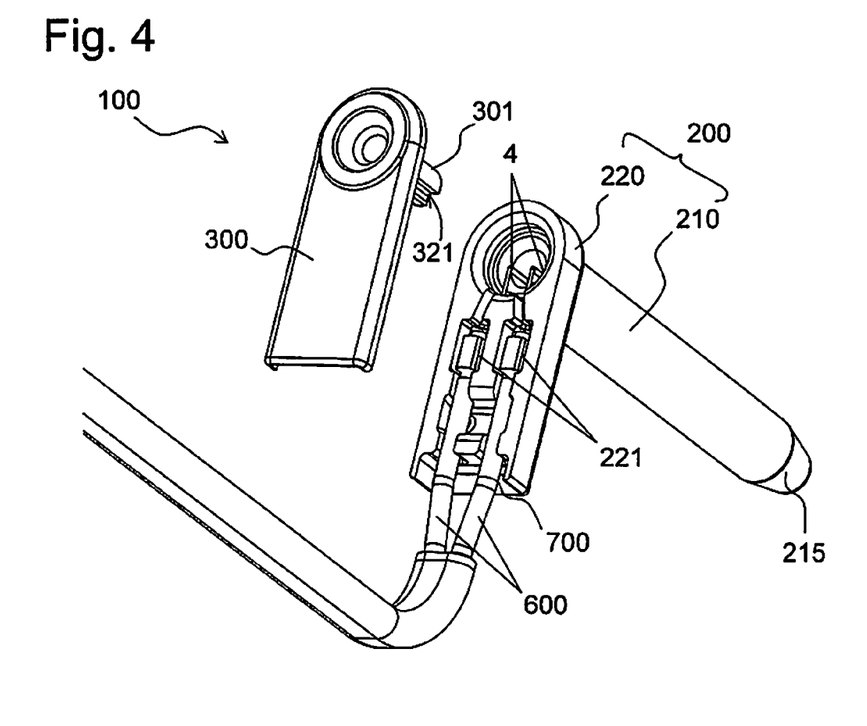
Figures 5, 6:
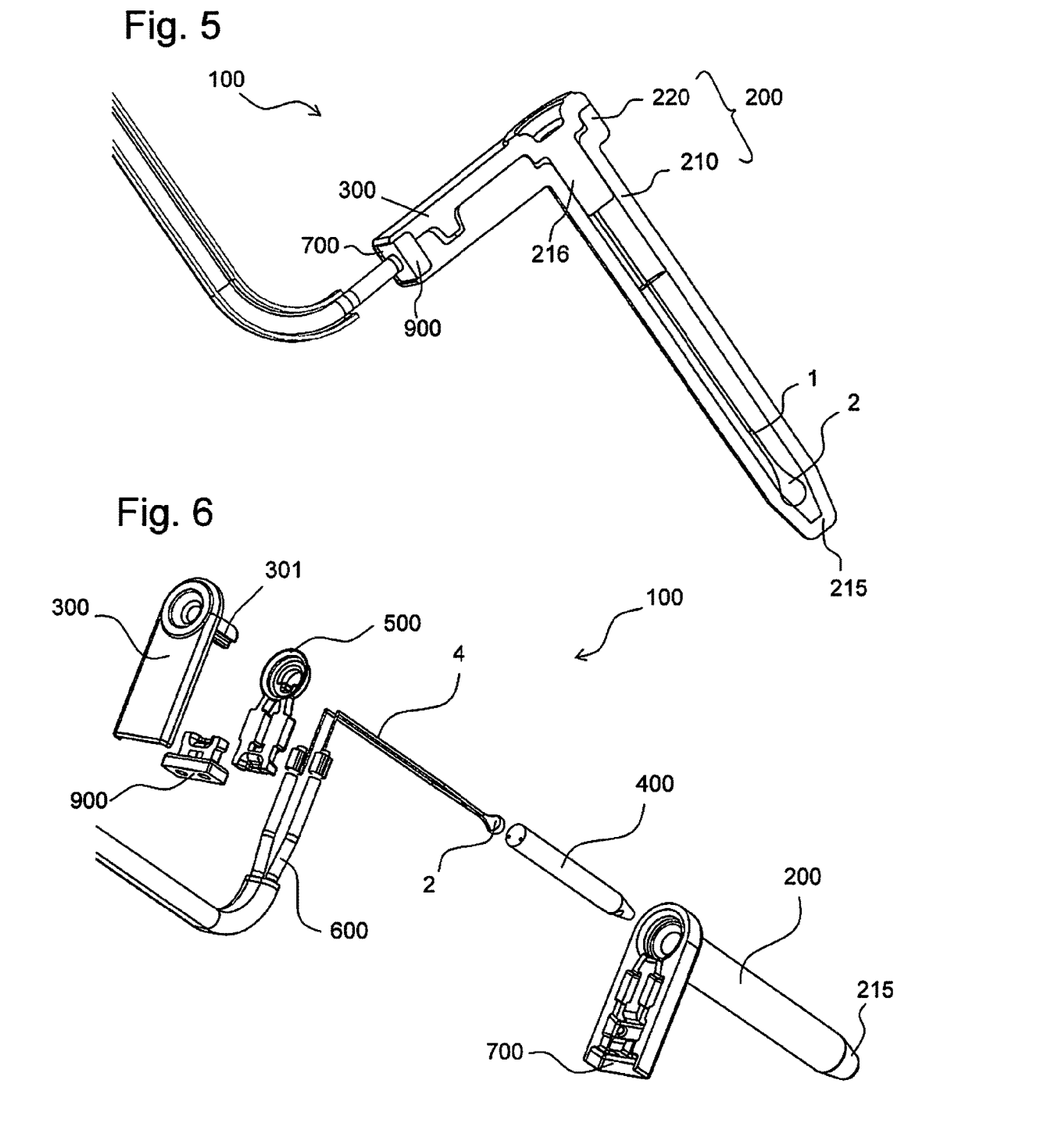
FIG. 5 shows a schematic sectional view of the temperature sensor system of FIGS. 1-4.
FIG. 6 shows a schematic illustration of the temperature sensor system of FIGS. 1-4 in the form of an exploded illustration.

FIGS. 1-4 show various views of a temperature sensor system 100 described here in accordance with an exemplary embodiment. Here, the temperature sensor system 100 is illustrated in FIG. 3 without the second ceramic housing part 300. FIG. 5 shows the temperature sensor system 100 from FIGS. 1-4 in a sectional view, and in FIG. 6 the temperature sensor system 100 is shown in the form of an exploded illustration. The following description relates equally to FIGS. 1 to 6.

The temperature sensor system 100 comprises a temperature probe element 1, which comprises a sensor element 2 and electrical feed lines 4. The sensor element 2 is embodied in the shown exemplary embodiment as an NTC sensor element and is provided with a glass encapsulation.

The sensor element 2 has a perovskite structure comprising the elements Y, Ca, Cr, Al, O. In particular the sensor element 2 has the composition $(Y_{1-x}Ca_x)(Cr_{1-y}Al_y)O_3$ with x=0.03 to 0.05 and y=0.85. The temperature sensor system 100 is thus suitable advantageously for use at high application temperatures, for example between 300° C. and 1000° C. Alternatively, the sensor element 2 may have a spinel structure.

Alternatively to an NTC sensor element, the sensor element 2 may be for example a silicon sensor element, a platinum sensor element, or a thermocouple.

Furthermore, the temperature sensor system 100 comprises a first ceramic housing part 200 comprising a sleeve-shaped lower part 210 with a closed lower end 215 and an open upper end 216 as well as an upper part 220 connected to the open upper end 216. The sleeve-shaped lower part 210 and the upper part 220 together form an "L-shaped" body, which is formed in one piece. The first ceramic housing part 200 is an injection-molded part, which is produced by means of a ceramic injection molding method. The first ceramic housing part 200 comprises aluminum oxide. Alternatively, the first ceramic housing part 200 may also comprise aluminum nitride or silicon carbide, or may consist of one of the aforementioned materials.

The sensor element 2 is arranged in the sleeve-shaped lower part 210 in the vicinity of the closed lower end 215. The electrical feed lines 4 connected to the sensor element 2 run in the direction of the open upper end 216. The upper part 220 of the first ceramic housing part 200 comprises recesses 221, in which the electrical feed lines 4 of the temperature probe element 1 are arranged and guided at least in part.

The temperature sensor system 100 further comprises a second ceramic housing part 300, which is connected to the upper part 220 of the first ceramic housing part 200. The second ceramic housing part 300 comprises an extension 301, which comprises recesses 321, in which the electrical feed lines are arranged and guided at least in part. The second ceramic housing part 300 likewise comprises aluminum oxide and is also produced as an injection-molded part.

The first and the second ceramic housing part 200 and 300 are interconnected by means of a connecting substance 500.

The connecting substance 500 comprises a polymer. Alternatively, the connecting substance 500 may comprise a glass or a ceramic adhesive, or may consist of one of the aforementioned materials.

A potting material 400 is arranged in the sleeve-shaped lower part 210 of the first ceramic housing part 200 and encases the sensor element 2 of the temperature probe element 1. The potting material 400 comprises a polymer. Alternatively, the potting material 400 may comprise a glass or a cement-like material, such as aluminum oxide cement, or may consist of one of the aforementioned materials.

The electrical feed lines 4 are connected to thermally stable connection lines 600 by means of hard soldering. Alternatively, the electrical feed lines 4 can be connected to the connection lines 600 by means of crimping or welding. The connection lines 600 comprise a sheathing, which consists of a polymer. It is also possible for the sheathing of the connection lines 600 to consist of glass fibers or for the connection lines 600 to be embodied as metal-sheathed mineral-insulated lines. The connection lines 600 are connected to a plug-in connection 800 by means of crimping. Alternatively, the connection lines 600 and the plug-in connection 800 can be connected by means of soldering or welding.

The temperature sensor system 100 comprises an exit region 700, in which the connection lines 600 exit from the first and second ceramic housing part 200 and 300. The exit region 700 is closed by means of a seal 900, which comprises a polymer. Alternatively, the seal 900 may comprise a glass or a ceramic potting material, or may consist of one of the aforementioned materials.

The temperature sensor system 100 advantageously has very short response times, very high mechanical and chemical robustness, and good long-term stability. The temperature sensor system 100 can thus also be used at high application temperatures and in particularly aggressive media or gases. Further advantages of the temperature sensor system 100 lie in a very precise embodiment of the housing dimension, which enables simple and standardized mounting without additional system elements.

Figure 7:
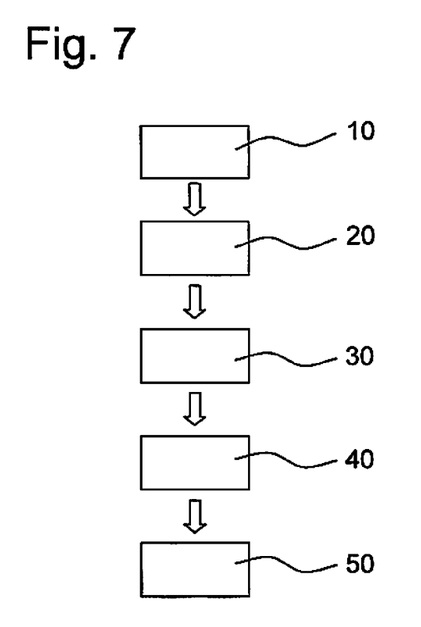
FIG. 7 shows a method for producing a temperature sensor system in accordance with a further exemplary embodiment.

FIG. 7 shows a method for producing a temperature sensor system 100 described here in accordance with an exemplary embodiment. Components identified in connection with method steps are not shown in FIG. 7, but are shown in FIGS. 1-6. Here, a temperature probe element 1 and also a first and a second ceramic housing part 200 and 300 are provided in a first method step 10. The first and second ceramic housing part 200 and 300 are preferably produced by means of ceramic injection molding technology. Here, a ceramic feedstock, which comprises a structural ceramic powder formed from aluminum oxide powder and an organic binder, is injected into a desired mold, and the green bodies thus produced are then largely freed from organic components in a debindering process. The debindered bodies are then sintered at 1600° C. to 1700° C.

In the subsequent method step 20 the temperature probe element 1 is arranged in the closed lower end 215 of the sleeve-shaped lower part 210 of the first ceramic housing part 200. In method step 30 potting material 400 is then introduced into the first ceramic housing part 200, in particular into the sleeve-shaped lower part 210, in such a manner that the sensor element 2 is encased by the potting material 400. The potting material 400 preferably comprises a polymer. Alternatively, the potting material 400 may comprise a glass or a cement-like material, such as aluminum oxide cement, or may consist of one of the aforementioned materials. In the subsequent method step 40 part of the electrical feed lines 4 of the temperature probe element 1 is arranged in the recesses 221 of the upper part 220 of the first ceramic housing part 200. The upper part 220 of the first ceramic housing part 200 is then connected in method step 50 to the second ceramic housing part 300 by means of a connecting substance 500, which for example comprises a polymer, a glass or a ceramic adhesive, wherein regions of the electrical feed lines 4 are guided in the recesses 321 of the extension 301 of the second ceramic housing part 300. The exit region 700 is then closed by means of a seal 900, which comprises a polymer. Alternatively, the seal 900 may also comprise a glass or a ceramic potting material, or may consist of one of the aforementioned materials.

The exemplary embodiments shown in the figures alternatively or additionally may have further features according to the embodiments of the general description.

The invention is not limited to the description provided on the basis of the exemplary embodiments, but comprises any novel feature and also any combination of features. This includes in particular any combination of features in the claims, even if this feature or this combination itself is not explicitly specified in the claims or exemplary embodiments.

The invention claimed is:

1. A temperature sensor system, comprising:
a temperature probe element comprising a sensor element and electrical feed lines;
a first ceramic housing part adapted and arranged to protect the temperature sensor system from outside media, the first ceramic housing part comprising:
a sleeve-shaped first part with a closed first end and an open second end, wherein the sensor element is arranged in the sleeve-shaped first part; and
a second part adjoining the open second end, wherein the second part comprises recesses in which the electrical feed lines are arranged and guided in part, wherein the sleeve-shaped first part and the second part are parts of a single piece; and
a second ceramic housing part connected to the second part of the first ceramic housing part, the second ceramic housing part comprising an extension which extends into the open second end of the sleeve-shaped first part, wherein the extension comprises recesses in which the electrical feed lines are arranged and guided at least in part.

2. The temperature sensor system according to claim 1, wherein the first ceramic housing part is an injection-molded part.

3. The temperature sensor system according to claim 1, wherein the first ceramic housing part comprises aluminum oxide, aluminum nitride or silicon carbide.

4. The temperature sensor system according to claim 1, wherein the first and the second ceramic housing parts are interconnected by a connecting substance that comprises a polymer, glass, or a ceramic adhesive.

5. The temperature sensor system according to claim 1, further comprising a potting material arranged in the first part of the first ceramic housing part and encasing the sensor element.

6. The temperature sensor system according to claim 5, wherein the potting material comprises a polymer, glass, or aluminum oxide cement.

7. The temperature sensor system according to claim 1, wherein the sensor element is an NTC sensor element.

8. The temperature sensor system according to claim 7, wherein the NTC sensor element has a perovskite structure with a composition of $(Y_{1-x}Ca_x)(Cr_{1-y}Al_y)O_3$, with $x=0.03$ to $0.05$ and $y=0.85$.

9. The temperature sensor system according to claim 7, wherein the NTC sensor element has a spinel structure with a composition of $Co_{3-(x+y)}Ni_xMn_yO_4$ with $x=1.32$ and $y=1.32$.

10. A method for producing a temperature sensor system, comprising:
provproviding a temperature probe element comprising a sensor element and electrical feed lines;
providing a first ceramic housing part and a second ceramic housing part, wherein the first ceramic housing part comprises a sleeve-shaped first part and a second part comprising an extension with recesses;
arranging the temperature probe element in the sleeve-shaped first part of the first ceramic housing part;
introducing potting material into the first ceramic housing part in such a manner that the sensor element is encased by the potting material;
arranging part of the electrical feed lines in the recesses of the extension of the second part of the first ceramic housing part; and
connecting the second part of the first ceramic housing part to the second ceramic housing part such that portions of the electrical feed lines are circumferentially enclosed in part by the first ceramic housing part and in part by the second ceramic housing part, and each of the first ceramic housing part and the second ceramic housing part extend along a same portion of the portions of the electrical feed lines;
wherein the connection is made by a connecting substance.

11. The method according to claim 10, wherein the potting material and the connecting substance comprise the same material.

12. The method according to claim 10, wherein the electrical feed lines are connected using hard soldering, crimping or welding to connection lines, and wherein the connection lines are arranged partly in the recesses of the extension of the second part prior to the connection of the second part to the second ceramic housing part.

13. The method according to claim 12, wherein the connection lines are sealed by a polymer or glass in an exit region from the first ceramic housing part, the second ceramic housing part, or both.

14. A method for producing a temperature sensor system, comprising:
providing a temperature probe element comprising a sensor element and electrical feed lines;
providing a first ceramic housing part adapted and arranged to protect the temperature sensor system from outside media, the first ceramic housing part comprising a sleeve-shaped first part, wherein the sleeve-shaped first part comprises a closed first end and an open second end;
providing a second ceramic housing part, the second ceramic housing part being configured to connect to the second part of the first ceramic housing part, wherein the second ceramic housing part comprises an extension which extends into the open second end of the sleeve-shaped first part, wherein the extension comprises recesses;
arranging the temperature probe element in the sleeve-shaped first part of the first ceramic housing part; and
arranging part of the electrical feed lines in recesses of a second part of the first ceramic housing part, wherein the second part adjoins the open second end, and wherein the sleeve-shaped first part and the second part are formed in one piece; and
connecting the second ceramic housing part to the first ceramic housing part in a manner that the electrical feed lines are arranged and guided at least in part by recesses of the extension.

15. The method according to claim 14, wherein the first ceramic housing part is an injection-molded part.

16. The method according to claim 14, wherein the first ceramic housing part and the second ceramic housing part are interconnected by a connecting substance that comprises a polymer, glass, or a ceramic adhesive.

17. The method according to claim 14, further comprising a arranging a potting material in the first part of the first ceramic housing part and encasing the sensor element in the potting material.

18. The method according to claim 14, wherein the sensor element is an NTC sensor element.

19. The method according to claim 18, wherein the NTC sensor element has a perovskite structure with a composition of $(Y_{1-x}Ca_x)(Cr_{1-y}Al_y)O_3$, with $x=0.03$ to $0.05$ and $y=0.85$.

20. A temperature sensor system, comprising:
a temperature probe element comprising a sensor element and electrical feed lines; and
a first ceramic housing part comprising:
a sleeve-shaped first part with a closed first end and an open second end, wherein the sensor element is arranged in the sleeve-shaped first part; and
a second part adjoining the open second end, wherein the second part comprises recesses in which the electrical feed lines are arranged and guided in part, wherein the sleeve-shaped first part and the second part are parts of a single piece; and
a second ceramic housing part connected to the second part of the first ceramic housing part such that portions of the electrical feed lines are circumferentially enclosed in part by the first ceramic housing part and in part by the second ceramic housing part, and each of the first ceramic housing part and the second ceramic housing part extend along a same portion of the portions of the electrical feed lines.

21. The temperature sensor system according to claim 20, wherein the sleeve-shaped first part and the second part of the first ceramic housing part form an L-shaped body.

* * * * *